United States Patent [19]

Nose

[11] Patent Number: 4,887,888
[45] Date of Patent: Dec. 19, 1989

[54] OBJECTIVE LENS DRIVING DEVICE

[75] Inventor: Hiroyasu Nose, Tokyo, Japan

[73] Assignee: Canon Kabushiki Kaisha, Tokyo, Japan

[21] Appl. No.: 306,384

[22] Filed: Feb. 6, 1989

Related U.S. Application Data

[60] Division of Ser. No. 933,333, Nov. 20, 1986, Pat. No. 4,818,066, which is a continuation of Ser. No. 692,630, Jan. 18, 1985, abandoned.

[30] Foreign Application Priority Data

| Jan. 30, 1984 | [JP] | Japan | 59-13469 |
| Jan. 30, 1984 | [JP] | Japan | 59-13470 |
| Jan. 30, 1984 | [JP] | Japan | 59-13471 |
| Sep. 18, 1984 | [JP] | Japan | 59-195365 |

[51] Int. Cl.⁴ .......................... G02B 7/04; G11B 7/08
[52] U.S. Cl. .................................. 350/247; 350/252; 350/255; 369/44; 369/45
[58] Field of Search ...................... 350/247, 252, 255; 369/44, 45

[56] References Cited

U.S. PATENT DOCUMENTS

| 3,731,548 | 5/1973 | Bocksruker | 74/96 |
| 4,472,024 | 9/1984 | Konomura et al. | 350/247 |
| 4,664,476 | 5/1987 | Kasuga | 350/247 |

FOREIGN PATENT DOCUMENTS

| 69540 | 4/1982 | Japan . | |
| 57-71532 | 5/1982 | Japan | 369/45 |
| 57-94939 | 6/1982 | Japan | 369/45 |
| 58-111134 | 7/1983 | Japan | 369/45 |
| 111135 | 7/1983 | Japan . | |
| 58-111136 | 7/1983 | Japan | 369/45 |
| 155529 | 9/1983 | Japan . | |
| 191147 | 10/1984 | Japan . | |
| 8301430 | 11/1983 | Netherlands . | |

Primary Examiner—Rodney B. Bovernick
Assistant Examiner—Martin Lerner
Attorney, Agent, or Firm—Fitzpatrick, Cella, Harper & Scinto

[57] ABSTRACT

An objective lens driving device comprises a holding member for holding an objective lens, an intermediate support member spaced apart from the optic axis of the objective lens and constructed for rotation about a rotary support axis parallel to the optic axis, a parallel plate spring having one end thereof secured to the holding member and the other end thereof secured to the intermediate support member, the parallel plate spring supporting the holding member for movement only in the direction of the optic axis of the objective lens relative to the intermediate support member, and driving means for driving the holding member in the direction of the optic axis of the objective lens and a direction perpendicular to the optic axis.

8 Claims, 9 Drawing Sheets

Fig. 5A
Fig. 5B
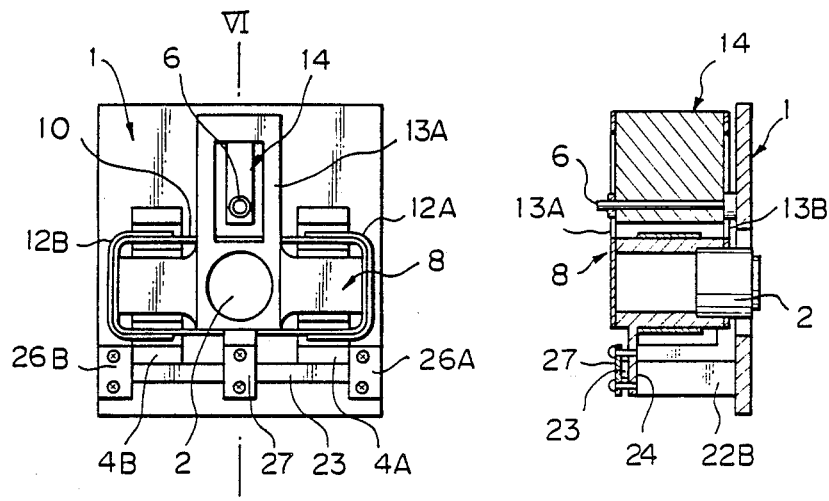
Fig. 5C
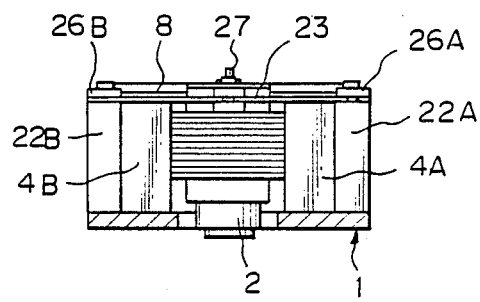

OBJECTIVE LENS DRIVING DEVICE

This application is a division of application Ser. No. 933,333 filed Nov. 20, 1986 now U.S. Pat. No. 4,818,066 issued April 4, 1989, which is a continuation of application Ser. No. 692,630 filed on Jan. 18, 1985 now abandoned.

BACKGROUND OF THE INVENTION

1. Field of the Invention

This invention relates to a device for driving an objective lens in the direction of the optic axis thereof and a direction perpendicular to the optic axis, and more particularly to an objective lens driving device suitable for use in an optical recording-reproducing apparatus which condenses a light beam on a recording medium and thereby accomplishes recording or reproduction of information.

2. Description of the Prior Art

In recent years, along with the advance of the information society, the demand has been rising for optical recording-reproducing apparatuses for recording information on a recording medium such as an optical disc by the use of a light beam or for reproducing the information accumulated on a recording medium. Usually, in such optical recording-reproducing apparatuses, the focus control in which whether the beam spot condensed by an objective lens is accurately focused to the information track on the recording medium is detected and the objective lens is displaced in the direction of the optic axis (the focus direction) on the basis of the detected error signal and the tracking control in which the amount of deviation of said spot from the information track is detected and the objective lens is displaced in a direction perpendicular to the information track (the tracking direction) on the basis of the detected tracking error signal are effected. In driving such an objective lens, a device is necessary in which when the objective lens is to be displaced in the focus direction or the tracking direction, the optic axis thereof is not inclined or the controls in the respective directions do not interfere with each other and which can accurately move the objective lens independently in the respective directions.

As a conventional objective lens driving device of this type, there has been proposed a device in which an objective lens is mounted at a position eccentric from the center axis of an objective lens holding cylinder and a fixed shaft projecting from a portion of an objective lens driving device housing is passed through the center axis of the objective lens holding cylinder and the objective lens holding cylinder is rotated about said fixed shaft, whereby the objective lens is moved in the tracking direction and by causing the objective lens holding cylinder to slide along said fixed shaft, the objective lens is moved in the focus direction (EP No. 68757).

In such an objective lens driving device, a coil for imparting a drive in the focus direction and a coil for imparting a drive in the tracking direction have been provided around the outer peripheral portion of the objective lens holding cylinder and these coils have been disposed so as to cross a magnetic circuit comprising a yoke and a permanent magnet provided inside and outside the objective lens holding cylinder Also, the objective lens holding cylinder has been designed to be held at a neutral position in both the focus direction and the tracking direction by a restitution spring formed of a visco-elastic material such as rubber.

However, the conventional objective lens driving device as described above has suffered from a disadvantage that when the objective lens is driven in the focus direction, the holding cylinder slides relative the fixed shaft and therefore a friction force is created to cause a stick slip phenomenon or the sliding resistance is remarkably increased by extraneous conditions such as dewing and the like and in the worst case, the device becomes inoperable. Also, when the entire optical recording-reproducing apparatus is inclined, instability of the focus control operation is caused by the increase in friction force resulting from the difference in posture, and this has sometimes led to the deterioration of the control performance. Further, since the restitution spring is comprised of a single member, it has been difficult to make a design wherein both of the spring constants in the focus direction and the tracking direction are made into optimum values, and there has also been a disadvantage that the displacements in the respective directions influence each other through the restitution spring and adversely affect the control performances in the respective directions.

SUMMARY OF THE INVENTION

It is an object of the present invention to eliminate the above-noted disadvantages peculiar to such conventional device and to provide an objective lens driving device which is hard to be affected by extraneous conditions and is stably operable for a long period of time.

The above object of the present invention is achieved by an objective lens driving device comprising a holding member for holding an objective lens, an intermediate support member spaced apart from the optic axis of the objective lens and constructed for rotation about a rotary support axis parallel to said optic axis, a parallel plate spring having one end thereof secured to the holding member and the other end secured to the intermediate support member, the parallel plate spring supporting the holding member for movement only in the direction of the optic axis of the objective lens relative to the intermediate support member, and driving means for driving the holding member in the direction of the optic axis of the objective lens and a direction perpendicular to the optic axis.

BRIEF DESCRIPTION OF THE DRAWINGS

FIGS. 5A–5C show the construction of a second embodiment of the present invention

DESCRIPTION OF THE PREFERRED EMBODIMENTS

Figure 1:
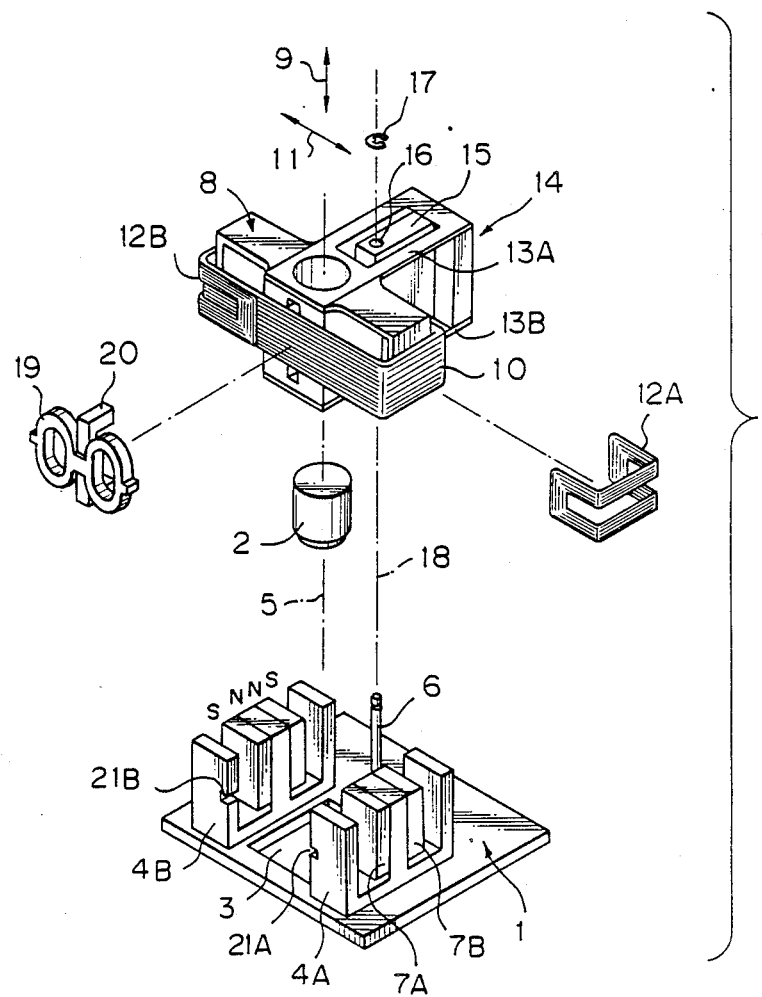
FIGS. 1 and 2A–2C show the construction of a first embodiment of the objective lens driving device of the present invention.
Figure 2A:
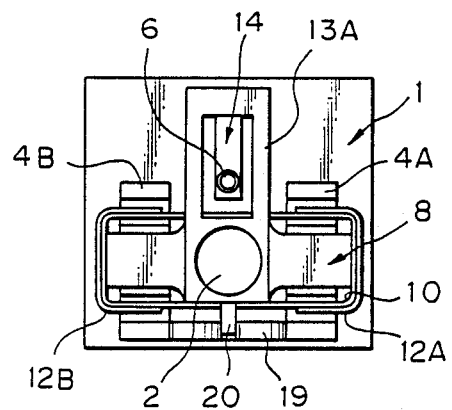
Figure 2B:
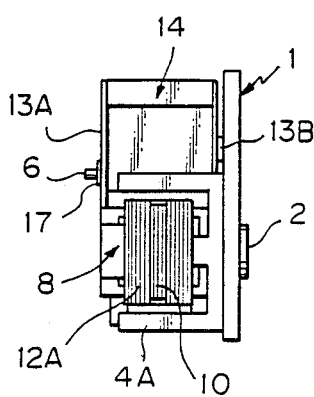
Figure 2C:
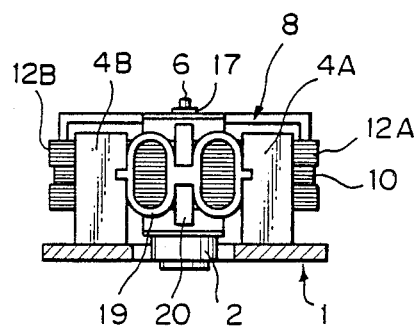

Some embodiments of the present invention will hereinafter be described by reference to the drawings FIGS. 1 and 2 illustrate a first embodiment of the objective lens driving device of the present invention, FIG. 1 being an exploded perspective view, and FIGS. 2A, 2B and 2C being a plan view, a side view and a front view, respectively. An objective lens hole 3 which an objective lens 2 looks into is formed in the central portion of a base plate 1, and E-shaped yokes 4A and 4B having their open ends facing upward are fixed to the opposite sides of the objective lens hole 3. A pillar-like fixed shaft 6 parallel to the optic axis 5 of the objective lens 2 is provided at the shown position on the base plate 1.

The E-shaped yokes 4A and 4B are made of a ferromagnetic material such as electromagnetic soft iron, and permanent magnets 7A and 7B are adhesively secured to the opposite sides of the middle projections of E in such a manner that the same poles of the magnets are opposed to each other, whereby a magnetic circuit is formed.

On the other hand, the objective lens 2 is fixed to an objective lens holding member 8. A square-shaped coil 10 for generating a driving force in the focus direction (the direction of arrow 9) is adhesively secured to the periphery of the objective lens holding member 8, and flattened coils 12A and 12B for generating a driving force in the tracking direction (the direction of arrow 11) are adhesively secured to the surface of the square-shaped coil 10.

The objective lens holding member 8 is engaged with an intermediate support member 14 by a pair of upper and lower parallel plate springs 13A and 13B, and is supported for movement only in the focus direction 9 relative to the intermediate support member without inclining the optic axis of the objective lens 2. The parallel plate springs 13A and 13B may be made of a metal or a plastic or a visco-elastic material such as FRP (fiber-reinforced plastic).

A projection 15 projecting toward the objective lens holding member 8 as shown is formed on the intermediate support member 14, and this projection 15 is provided with an aperture-like bearing portion 16 into which said fixed shaft 6 is inserted. Accordingly, the intermediate support member 14 is mounted on the base plate 1 for movement about a rotary support axis 18 parallel to the optic axis 5 but against movement in the axial direction by fitting the bearing portion 16 over the fixed shaft 6 and mounting a snap ring 17 on the fixed shaft 6.

Thus, it can be considered that the objective lens holding member 8 and the parallel plate springs 13A and 13B are mounted for rotation about the rotary support axis 18 with the intermediate support member 14 and when the angle of rotation is small, the objective lens 2 is moved substantially in the tracking direction 11.

A restitution spring 19 for maintaining the neutral position in the tracking direction is provided between the objective lens holding member 8 and the fixed portion on the base plate 1 side. In the example shown, the restitution spring 19 is formed of a visco-elastic material such as silicon rubber and into a sidelong 8-shape, and the central portion of the restitution spring 19 is fixed to the objective lens holding member 8 by a fixing part 20 and the opposite ends of the restitution spring 19 are adhesively secured to cutaways 21A and 21B formed in portions of the yokes 4A and 4B on the base plate 1. This restitution spring 19, which is formed in 8-shape as shown, has a weak spring force in the focus direction of arrow 9 and hardly acts as a spring in this direction and chiefly acts as a spring for generating a restitution force in the tracking direction of arrow 11. Accordingly, by choosing the material, hardness or thickness of the restitution spring 19, a design for obtaining a desired spring constant is possible and the neutral position in the tracking direction can be maintained independently of the parallel plate springs 13A and 13B in the focus direction. Also, since the restitution spring 19 is formed of a visco-elastic material such as silicon rubber, the attenuation effect of suppressing the amplitude during resonance is obtained, and the making and mounting thereof with respect to the device is simple.

To assemble the above-described objective lens driving device, the objective lens holding member 8, the parallel plate springs 13A, 13B and the intermediate support member 14 are first assembled together, and then the bearing portion 16 of the intermediate support member 14 is inserted over the fixed shaft 6 studded on the base plate 1 and the intermediate support member 14 is mounted for rotation about the axis 18 but against movement in the axial direction by the snap ring 17.

This mounting of the intermediate support member with respect to the fixed shaft 6 is effected in such a positional relation that, as shown in FIG. 2A, the square-shaped coil 10 and the flattened coils 12A, 12B come into the gaps of the E-shaped yokes 4A and 4B.

Subsequently, the opposite ends of the restitution spring 19 fixed to the objective lens holding member 8 are adhesively secured to the cut-aways 21A and 21B of the yokes 4A and 4B, as shown in FIG. 2C, whereby the assembly is completed.

The manner in which the driving forces for the objective lens holding member 8, i.e., the driving forces in the tracking direction and the focus directions for the objective lens 2, are generated will now be described by reference to FIG. 3 which is a perspective view of only the coils of the above-described device. If a current is flowed to the flattened coils 12A and 12B in the directions of arrows 23 when a magnetic field is acting in the direction of arrow 22, a driving force is generated in the direction of arrow 24 by the Fleming's left-hand rule and this provides a force which rotates the objective lens holding member 8 about the fixed shaft 6 and thus, the objective lens 2 is moved in the tracking direction.

On the other hand, if a current in the direction of arrow 25 flows to the square-shaped coil 10, a driving force is generated in the direction of arrow 26 and the objective lens holding member 8 is moved in the focus direction (the direction of arrow 9 in FIG. 1) without the optic axis 5 being inclined with the aid of the resilient support of the parallel plate springs 13A and 13B.

Figure 3:
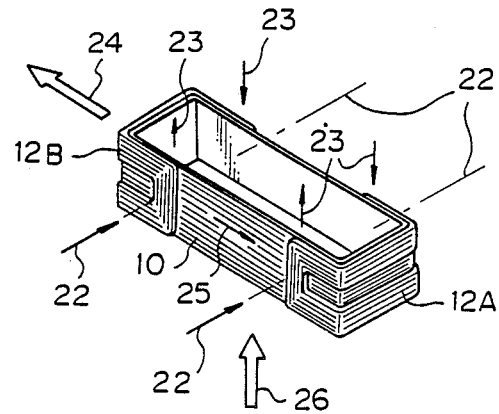
FIG. 3 is a perspective view of coils illustrating the generation of a drive force in the first embodiment.

If the directions (arrows 23 and 25) of the current are made opposite to those indicated in FIG. 3, the directions of the driving forces will become opposite and the tracking control and focus control in the opposite directions will be effected.

Figure 4:
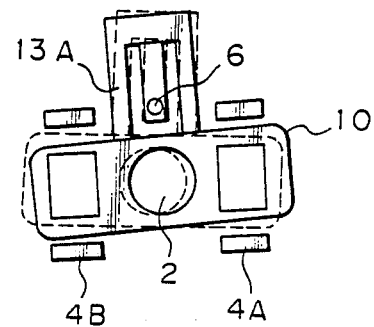
FIG. 4 is a schematic plan view illustrating the driving in the tracking direction in the first embodiment.

When a driving force is generated in the tracking direction, the objective lens holding member 8, the parallel plate springs 13A, 13B and the intermediate support member 14 are rotated about the fixed shaft 6 together with one another as indicated by broken lines in the schematic plan view of FIG. 4, but the square-shaped coil 10 and flattened coils 12A, 12B inserted in the gap of the magnetic circuit formed by the yokes 4A, 4B and permanent magnets 7A, 7B are moved by a minute amount within the range of the gap of the magnetic circuit. However, generally, the range of movement of the objective lens in the tracking direction is as small as the order of 0.5mm and therefore, the gap in the magnetic circuit need not be so wide and a magnetic field of sufficient intensity can be obtained.

Also, if the inertia efficiency of the objective lens holding member 8 and of the intermediate support member 14 with respect to the fixed shaft 6 are made equal to each other to balance the inertia force about the rotary support axis, the influence of vibration imparted from outside can be reduced and thus, there can be provided an objective lens driving device which can be drive-controlled accurately and quickly.

According to the above-described embodiment, the movement of the objective lens 2 in the focus direction is accomplished not by the utilization of the axial sliding movement of the fixed shaft 6 but by the utilization of only the elasic displacement of the parallel plate springs 13A and 13B and therefore can be accurately controlled without being affected by the stick slip resulting from a friction force and by the difference in posture, thus enhancing the focus control performance.

Also, design is made such that only the rotation for the movement in the tracking direction takes place about the fixed shaft 6, and the movement supporting mechanisms in the focus direction and the tracking direction are completely separated from each other and therefore, the mutual interference between the control operations in these directions can be eliminated, whereby the control performance can also be enhanced.

FIGS. 5A, 5B and 5C show a second embodiment of the present invention, FIG. 5A being a plan view, FIG. 5B being a cross-sectional view taken along line VI—VI of FIG. 5A, and FIG. 5C being a front view.

The present embodiment is substantially identical in construction to the first embodiment with the exception that the restitution spring 19 and the mounting structure thereof are changed. The changed portions will hereinafter be described, and the other portions are given reference characters similar to those in FIG. 1 and need not be described in detail.

In FIG. 5, restitution spring supporting beds 22A and 22B are provided uprightly on the opposite sides of the base plate 1, and a plate-like restitution spring 23 formed of a visco-elastic material such as silicon rubber is extended between these supporting beds. The central portion of the restitution spring 23 is mounted on a projection 24 projecting from the objective lens holding member 8. In the shown embodiment, the restitution spring 23 has its opposite ends secured to the restitution spring supporting beds 22A and 22B by snap plates 26A and 26B and has its central portion secured to the projection 24 by a snap plate 27.

Thus, the objective lens holding member 8, the parallel springs 13A, 13B and the intermediate support member 14 are supported for rotation about the fixed shaft 6, and the restitution force when they are rotated about the fixed shaft to move the objective lens 2 in the tracking direction is provided by the restitution spring 23 and the neutral position is maintained by the same spring. In this case, the restitution spring 23 displays its restitution force for the movement in the tracking direction (the direction of arrow 11 in FIG. 1) because it provides the tension of the plate-like visco-elastic material (rubber or the like), and hardly generates its restitution force for the focus direction (the direction of arrow 9 in FIG. 1) because a force is imparted in a direction perpendicular to the direction of extension of the restitution spring and the spring force in that direction becomes very small.

Accordingly, when the objective lens holding member 8 is displaced in the focus direction by the resiliency of the parallel plate springs 13A and 13B, the restitution spring 23 hardly generates its spring force, and the interference between the restitution force in the tracking direction by the restitution spring 23 and the restitution force in the focus direction by the parallel plate springs 13A and 13B can be eliminated to realize independent supports in the respective directions. Also, by varying the material and hardness of the restitution spring 23 and the width, thickness and initial tension of the plate members, the restitution force in the tracking direction can be easily adjusted.

According to the above-described first and second embodiments, the neutral position in the focus direction is maintained by the restitution force of the parallel plate springs 13A and 13B and the neutral position in the tracking direction is maintained by the spring force of another restitution spring and therefore, the restitution spring constants in the focus direction and the tracking direction can be set independently of each other, and the restitution force in each direction can be set easily and accurately.

A third embodiment of the present invention will now be described by reference to FIGS. 6 to 8. In the present embodiment, instead of the fixed shaft 6, the bearing portion 16 and the restitution spring in the previously described embodiments, use is made of a flexible portion provided in a part of the intermediate support member. That is, the present embodiment is substantially identical in construction to the embodiment of FIGS. 1 and 2 with the exception that the rotary support shaft provided in parallelism to the optic axis at a position spaced apart from the opic axis to rotatably support the fixed portions of the parallel springs of the intermediate support member in a direction perpendicular to the optic axis is changed so as to be formed by a flexible portion provided in a part of the intermediate support member. Accordingly, only the changed portion of the present embodiment will hereinafter be described and the other common portions need not be described in detail.

Figure 6:
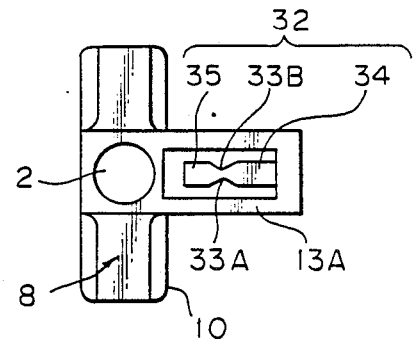
FIG. 6 is a schematic plan view showing the construction of a third embodiment of the present invention.
Figure 7:
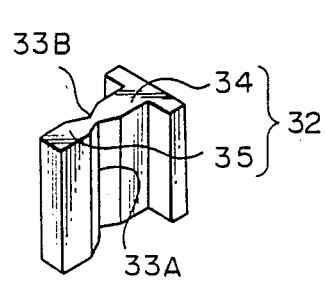
FIG. 7 is a perspective view of an intermediate support member in the device shown in FIG. 6.

FIGS. 6 and 7 are a schematic plan view and a perspective view, respectively, showing the essential portions of the present embodiment. An intermediate support member 32 is formed of a visco-elastic material such as fluorine resin in the form of a plate having a surface parallel to the plane containing the optic axis of the objective lens, and has on the opposite sides thereof grooves 33A and 33B of V-shaped cross-section formed in parallelism to the optic axis of the objective lens 2, and is provided with a parallel plate spring securing portion 34 and a base plate fixing portion 35 connected together by these grooves 33A and 3B.

The constricted portion (flexible portions) of the V-shaped grooves 33A and 33B is readily deformable, and the parallel plate spring securing portion 34 and the base plate fixing portion 35 are rotatable about these portions while generating a predetermined restitution spring force. The parallel plate spring securing portion 34 and the objective lens holding member 8 are coupled together by a pair of upper and lower parallel springs 13A and 13B similar to those shown in FIG. 1. On the other hand, the base plate fixing portion 35 is fixed to the base plate 1 as by screws or an adhesive. The objective lens 2 is likewise supported by the objective lens holding member 8. In FIG. 6, reference numeral 10 designates a driving square-shaped coil.

Accordingly, the objective lens holding member 8, the parallel plate springs 13A, 13B and the parallel plate spring securing portion 34 of the intermediate support member 32 are rotatable together about the constricted portion (flexible portion) of the grooves 33A and 33B relative to the fixed side (the base plate 1 and the base plate fixing portion 35) and are movable in the tracking direction of the objective lens 2.

Also, the constricted portion (flexible portion) of the grooves 33A and 33B has a springy property for keeping the neutral position of rotation, and the restitution spring 19 or 23 in the tracking direction shown in FIGS. 1 to 5 may be eliminated.

According to the present embodiment, there can be provided an objective lens driving device which can achieve the same operational effect as that achieved by the embodiments of FIGS. 1 to 5 and in addition, is simple in construction and requires a smaller number of parts and moreover is easy to assemble. Further, there can also be provided an objective lens driving device which is excellent in the vibration attenuating characteristic for suppressing the amplitude during resonance, by making the intermediate support member 32 of a visco-elastic material.

Figure 8:
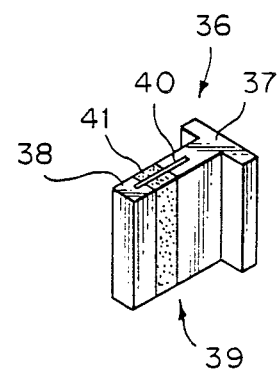
FIG. 8 is a perspective view showing a modification of the intermediate support member in the third embodiment.

FIG. 8 is a perspective view showing a modification of the intermediate support member in the third embodiment. The intermediate support member 36, as in the case of FIGS. 6 and 7, is provided with a parallel plate spring securing portion 37 and a base plate fixing portion 38, and a flexible portion 39 provided between these portions and functioning as a rotary support shaft is formed by a plate spring 40 having a surface parallel to the plane containing the optic axis of the objective lens and attenuating members 41 formed in a plate-like shape so as to sandwich the plate spring 40 therebetween.

The opposite ends of the plate spring 40 are fixed to the parallel plate spring securing portion 37 and the base plate fixing portion 38 which are formed of a material such as resin, as by molding, and the concave stepped portions on the opposite sides of the plate spring are filled with the attenuating members 41 formed of a visco-elastic material such as silicon rubber.

As in the case of FIGS. 6 and 7, a pair of upper and lower parallel plate springs 13A and 13B for permitting the movement in the focus direction and maintaining the neutral position are coupled between the parallel plate spring securing portion 37 and the objective lens holding member 8 (not shown), and the lower end of the base plate fixing portion 38 is fixed to the fixed side such as the base plate by an adhesive or screws.

Accordingly, the objective lens holding member 8, the parallel plate springs 13A, 13B and the parallel plate spring securing portion 37 of the intermediate support member 36 are supported for rotation about the flexible portion 39 by the flexure of the plate spring 40 and are maintained in the neutral position in the tracking direction by the springy property of the plate spring 40 and, during the driving in the tracking direction, there is obtained a predetermined restitution spring force. Also, the attenuating members 41 display the vibration attenuating effect for suppressing the resonance during the driving in the tracking direction.

Figure 9:
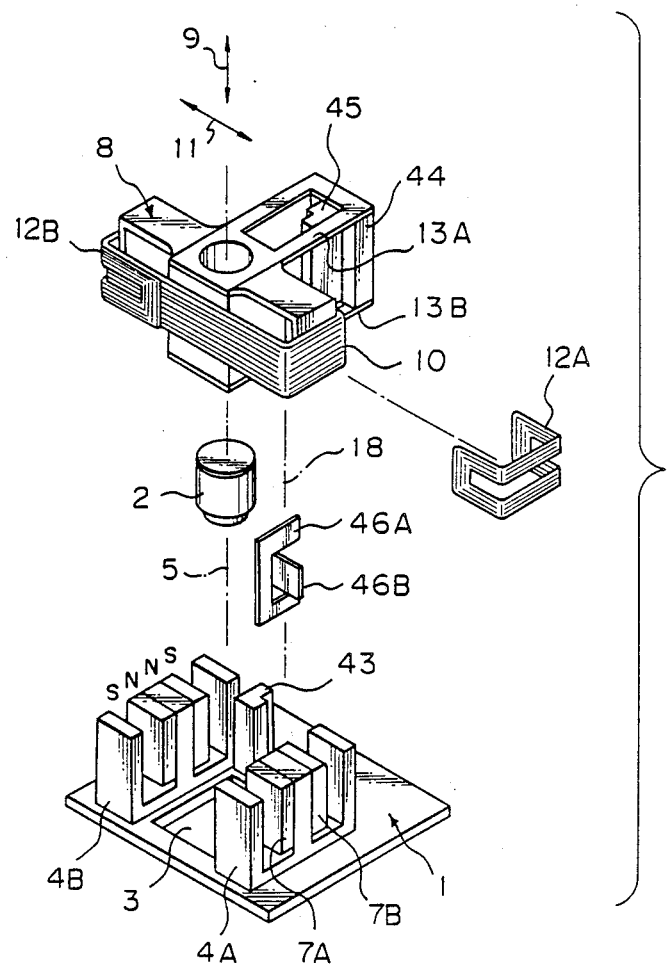
FIGS. 9 and 10A–10C show the construction of a fourth embodiment of the present invention.
Figure 10A:
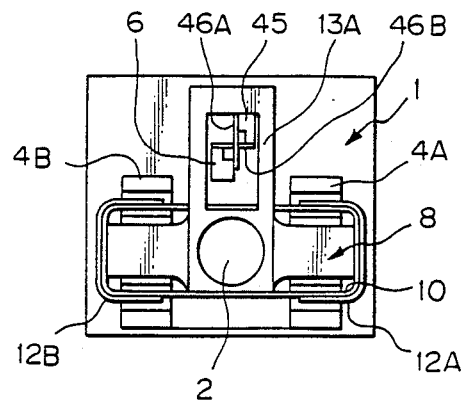
Figure 10B:
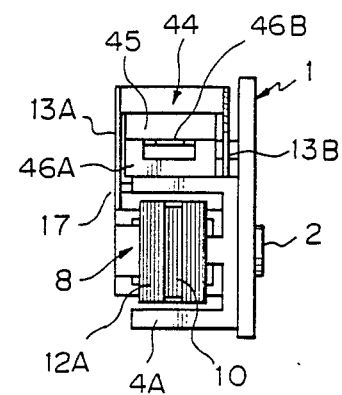
Figure 10C:
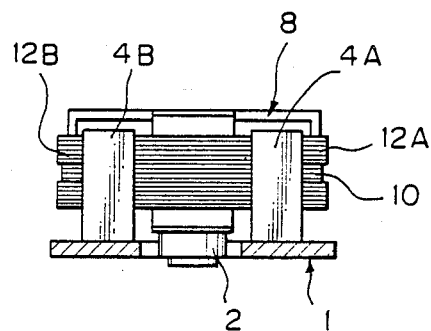

FIGS. 9 and 10 illustrate a fourth embodiment of the objective lens driving device of the present invention, FIG. 9 being an exploded perspective view, and FIGS. 10A, 10B and 10C being a plan view, a side view and a front view, respectively. The present embodiment is substantially identical in construction to the first embodiment with the exception that the rotary support shaft 18 is constituted by a cross spring. Accordingly, the changed portion of the present embodiment will hereinafter be described and the other portions are given reference characters similar to those in Figure and need not be described in detail.

Figure 11:
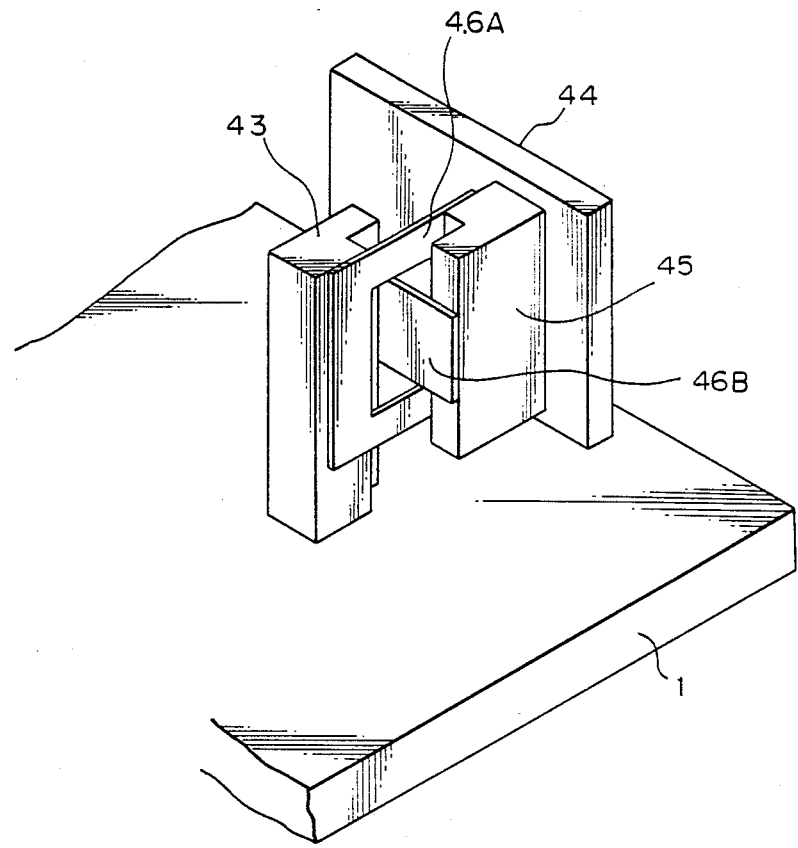
FIG. 11 is a fragmentary enlarged perspective view illustrating the cross spring structure in the fourth embodiment.

In FIGS. 9 and 10, a base plate fixing portion 43 to whose stepped portion is secured one end of each of plate springs 46A and 46B is provided at the shown position on the base plate 1. The lower end of this base plate fixing portion 43 is fixed to the base plate 1 by screws or an adhesive. Also, as shown, an intermediate support member 44 is formed with a projection 45 projecting toward the objective lens holding member 8, and the other ends of the plate springs 46A and 46B are secured to the stepped portion of the projection 45. These plate springs are provided so as to intersept each other perpendicularly to each other through the cut-away of the plate spring 46A and together constitute a cross spring structure as partly shown in FIG. 11. Accordingly, the intermediate support member 44 is supported on the base plate fixing portion 43 for rotation with the spatial line of intersection between the plate springs 46A and 46B as the rotary support axis 18.

Thus, the objective lens holding member 8 and the parallel plate springs 13A, 13B are mounted for rotation about the rotary support axis 18 integrally with the intermediate support member 44, and the objective lens 2 is movable substantially in the tracking direction 11 when the angle of rotation is small.

Also, the plate springs 46A and 46B which together constitute the cross spring generate a restitution force with the rotation thereof and maintain the neutral position in the tracking direction. If the plate springs 46A and 46B are formed of a visco-elastic material such as plastic, fiber-reinforced plastic or rubber, it will be possible to endow them with an attenuation characteristic for suppressing the amplitude when resonance is caused.

To assemble the above-described objective lens driving device, the objective lens holding member 8, the parallel plate springs 13A, 13B and the intermediate support member 44 are first assembled together into a unit and this unit is disposed so that, as shown in FIG. 10A, the square-shaped coil 10 and flattened coils 12A, 12B come into the gaps of the E-shaped yokes 4A and 4B, whereafter the plate springs 46A and 46B are adhesively secured between the projection 45 and the base plate fixing portion 43.

Figure 12:
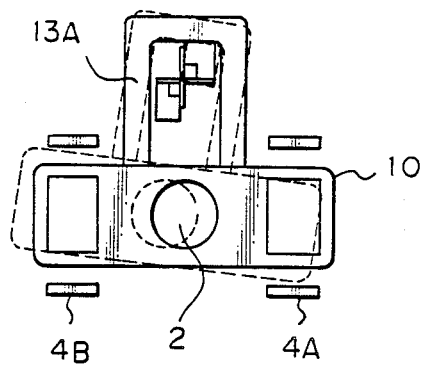
FIG. 12 is a schematic plan view illustrating the driving in the tracking direction in the fourth embodiment.

The driving in the tracking direction and the focus direction in the present embodiment is effected in a manner entirely similar to what has been described in connection with FIG. 3, and when a driving force is generated in the tracking direction, as shown in the schematic plan view of FIG. 12, the objective lens holding member 8, the parallel plate springs 13A, 13B and the intermediate support member 44 rotate about the rotary support axis formed by the cross spring, as indicated by broken lines.

Again in the present embodiment, the same operational effect as that of the first embodiment is obtained Also, the cross spring has a restitution force relative to the rotation thereof and therefore, even if means such as a restitution spring is not provided, the neutral position in the tracking direction can be maintained and stable tracking can be accomplished.

The objective lens driving device of the present invention is not limited to the above-described embodiments, but other various applications thereof are possible. For example, in the first and second embodiments, the restitution spring is provided to effect more stable tracking, but it may be eliminated depending on the usage thereof in which the driving force is always permitted to work. Also, the embodiments have been described with respect to a case where only the objective lens is moved, but design may also be made such that an entire optical system including a light source, etc. is driven. Further, the present invention is applicable not only to an optical recording-reproducing apparatus but also to an apparatus such as a body shape detecting apparatus or the line tracer of a laser processing machine in which an objective lens must be moved in the direction of the optic axis and a direction perpendicular to the optic axis.

I claim:

1. An objective lens driving device, comprising:
   a holding member for holding an objective lens;
   an intermediate support member constructed for rotation about a rotary support axis spaced apart from the optic axis of said objective lens and parallel to said optic axis, said intermediate support member being fixed to a base member by a shaft centered at said rotary support axis and by a bearing portion fitted over said shaft;
   parallel plate springs having one end thereof secured to said holding member and the other end thereof secured to said intermediate support member, said parallel plate springs supporting said holding ember for movement only in the direction of the optic axis of said objective lens relative to said intermediate support member;
   driving means for driving said holding member in the direction of the optic axis of said objective lens and a direction perpendicular to said optic axis; and
   an elastic member acting to maintain said holding member at neutral position about said shaft.

2. An objective lens driving device according to claim 1, wherein said elastic member comprises a sidelong 8(eight)-shaped visco-elastic member having the opposite end portions thereof fixed to said base member and the central portion thereof fixed to said holding member.

3. An objective lens driving device according to claim 1, wherein said elastic member comprises a plate-like visco-elastic member having the opposite end portions thereof fixed to said base member and the central portion thereof fixed to said holding member.

4. An objective lens driving device, comprising:
   a holding member for holding an objective lens;
   an intermediate support member constructed for rotation about a rotary support axis spaced apart from the optic axis of said objective lens and parallel to said optic axis;
   parallel plate springs having one end thereof secured to said holding member and the other end thereof secured to said intermediate support member, said parallel plate springs supporting said holding member for movement only in the direction of the optic axis of said objective lens relative to said intermediate support member; and
   driving means for driving said holding member in the direction of the optic axis of said objective lens and a direction perpendicular to said optic axis;
   wherein said intermediate support member is supported on a base member by a cross plate spring intersecting with said rotary support axis as the line of intersection.

5. An objective lens driving device, comprising:
   a holding member for holding an objective lens; an intermediate support member constructed for rotation about a rotary support axis spaced apart from the optic axis of said objective lens and parallel to said optic axis;
   parallel plate springs having one end thereof secured to said holding member and the other end thereof secured to said intermediate support member, said parallel plate springs supporting said holding member for movement only in the direction of the optic axis of said objective lens relative to said intermediate support member; and
   driving means for driving said holding member in the direction of the optic axis of said objective lens and a direction perpendicular to said optic axis, said driving means including first and second coils fixed to said holding member and having effective portions, respectively, a magnet for generating a magnetic field crossing said effective portions and means for flowing a current to said effective portions, the directions of the optic axis of said objective lens, the magnetic field crossing said effective portion of said first coil, and the current flowing in said effective portion of said first coil being perpendicular to one another, and the directions of the magnetic field crossing said effective portion of said second coil and the current flowing in said effective portion of said second coil, and said direction perpendicular to said optic axis being perpendicular to one another.

6. An objective lens driving device, comprising:
   a base body;
   a holding member for holding an objective lens;
   first supporting means including parallel plate springs for supporting said holding member for movement in the direction of the optical axis of the objective lens relative to said base body, said first supporting means being secured to said holding member and to said base body;
   second supporting means including a single leaf spring for supporting said holding member for movement in a direction crossing said optical axis of the objective lens relative to said base body, said second supporting means being secured to said holding member and to said base body, said single leaf spring having a plane parallel to a plane including said optical axis, and said holding member being rotatable about said leaf spring; and
   driving means for driving said holding member in the direction of said optical axis and the direction crossing said optical axis, relative to said base body.

7. An objective lens driving device according to claim 6, wherein said first and said second supporting means are connected at a point intermediate said base body and said holding member.

8. An objective lens driving device according to claim 6, wherein said second supporting means further includes attenuating members sandwiching said plate spring and formed of a visco-elastic material in a plate-like shape.

* * * * *

UNITED STATES PATENT AND TRADEMARK OFFICE
CERTIFICATE OF CORRECTION

PATENT NO. : 4,887,888
DATED : December 19, 1989
INVENTOR(S) : Hiroyasu Nose It is certified that error appears in the above-identified patent and that said Letters Patent is hereby corrected as shown below:

COLUMN 1

Line 65, "cylinder" should read --cylinder.--.

COLUMN 2

Line 56, "invention" should read --invention.--.

COLUMN 3

Line 7, "drawings" should read --drawings.--.

COLUMN 6

Line 41, "opic axis" should read --optic axis--.

COLUMN 9

Line 39, "ember" should read --member--.

Signed and Sealed this

Second Day of April, 1991

*Attest:*

*Attesting Officer*

HARRY F. MANBECK, JR.

*Commissioner of Patents and Trademarks*